United States Patent
Hashemi et al.

(10) Patent No.: US 8,045,257 B2
(45) Date of Patent: Oct. 25, 2011

(54) NONLINEAR HARMONIC GENERATION AND DEVICES IN DOUBLY-RESONANT KERR CAVITIES

(75) Inventors: Hila Hashemi, Cambridge, MA (US); Alejandro W. Rodriguez, Miami, FL (US); Marin Soljacic, Belmont, MA (US); Steven G. Johnson, Cambridge, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 303 days.

(21) Appl. No.: 12/470,798

(22) Filed: May 22, 2009

(65) Prior Publication Data

US 2011/0181942 A1    Jul. 28, 2011

Related U.S. Application Data

(60) Provisional application No. 61/055,804, filed on May 23, 2008.

(51) Int. Cl.
  *G02F 1/35* (2006.01)
(52) U.S. Cl. .................. 359/326; 359/329; 359/330
(58) Field of Classification Search .................. None
  See application file for complete search history.

(56) References Cited

U.S. PATENT DOCUMENTS

| | | | |
|---|---|---|---|
| 5,027,361 A | 6/1991 | Kozlovsky et al. | |
| 5,386,311 A | 1/1995 | Shields | |
| 5,434,700 A | 7/1995 | Yoo | |
| 5,574,738 A | 11/1996 | Morgan | |
| 5,708,671 A | 1/1998 | Siao et al. | |
| 5,898,717 A | 4/1999 | Yin | |
| 5,936,983 A | 8/1999 | Yusong et al. | |
| 6,122,306 A | 9/2000 | Sartorius et al. | |
| 6,373,867 B1 | 4/2002 | Lin et al. | |
| 6,690,692 B2 | 2/2004 | Gao et al. | |
| 7,027,209 B2 | 4/2006 | Zanger et al. | |
| 7,042,630 B2 | 5/2006 | Behfar | |
| 7,173,950 B2 | 2/2007 | Hand et al. | |
| 7,385,752 B1 | 6/2008 | Starodoumov et al. | |
| 7,397,829 B2 | 7/2008 | Yoo et al. | |
| 7,768,694 B2 * | 8/2010 | Rodriguez et al. | 359/326 |
| 2002/0154663 A1 | 10/2002 | Zhu et al. | |
| 2004/0218880 A1 | 11/2004 | Matsko et al. | |
| 2005/0213194 A1 * | 9/2005 | Kim et al. | 359/328 |
| 2008/0247428 A1 | 10/2008 | Rodriguez et al. | |
| 2009/0083679 A1 | 3/2009 | Achtenhagen et al. | |

OTHER PUBLICATIONS

Rodriguez et al., "X2 and X3 harmonic generation at a critical power in inhomogeneous doubly resonant cavities" optics Express, vol. 15, No. 12, May 31, 2007, pp. 7303-7318.

(Continued)

*Primary Examiner* — Hemang Sanghavi
(74) *Attorney, Agent, or Firm* — Gesmer Updegrove LLP

(57) ABSTRACT

A nonlinear harmonic generation system is provided. The nonlinear harmonic generation system includes a waveguide channel receives and propagates electromagnetic signals. A resonant cavity is coupled to the waveguide channel. The resonant cavity structure includes a plurality of resonant modes into which electromagnetic energy is coupled during the operation of the system. One of the resonant modes includes a resonant frequency that changes during operation of the system to reach either an input-signal frequency or a harmonic frequency for a majority of the time in which harmonic generation is occurring. Both reflected and harmonic fields are emitted back into the waveguide channel so as to allow efficient harmonic generation at a specified critical input power.

24 Claims, 9 Drawing Sheets

OTHER PUBLICATIONS

Carmon et al., Visible continuous emission from a silica microphotonic device by third-harmonic generation Nature Publishing Group, vol. 3, Jun. 2007, pp. 430-435.

Corcoran et al., "Green light emission in silicon through clow-light enhanced third-harmonic generation in photonic-crystal waveguides" Nature Photonics, Letters. vol. 3, Apr. 2009, pp. 206-210.

Drummond et al., "Non-equilibrium transitions in sub/second harmonic generation, I. Semiclasssical theory" Optica Acta, vol. 27, No. 3, 1980, pp. 321-335.

Drummond et al., "Non-equilibrium transitions in sub/second harmonic generation, II Quantum Theory" Optica Acta, vol. 28, No. 2, 1981, pp. 211-225.

Efimov et al., "Phase-matched third harmonic generation in microstructured fibers" Optics Express, vol. 11, No. 20, Oct. 6, 2003, pp. 2567-2576.

McNeil et al., "Self Pulsing in Second Harmonic Generation" Optics Communications, vol. 27, No. 2, Nov. 1978, pp. 292-294.

Ou Et al., "Enhanced conversion efficiency for harmonic generation with double resonance" Optics Letters, vol. 18, No. 13, Jul. 1, 1993, pp. 1053-1055.

Serebryannikov et al., "Third-harmonic generation by Raman-shifted solitons in a photonic-crystal fiber" Optical Society of America, vol. 23, No. 9, Sep. 2006, pp. 1975-1980.

Sibilia et al., "Cascading effect on second-harmonic generation in a ring cavity" Optical Society of America, vol. 13, No. 6, Jun. 1996, pp. 1151-1159.

Soljacic et al., "Optimal bistable switching in nonlinear photonic crystals" The American Physical Society, 66, 2002., pp. 055601-1-055601-4.

* cited by examiner

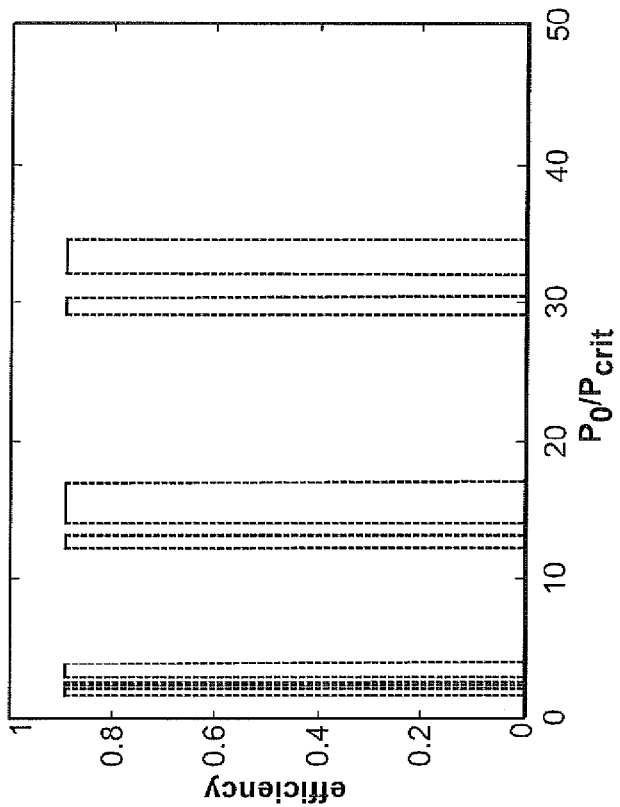
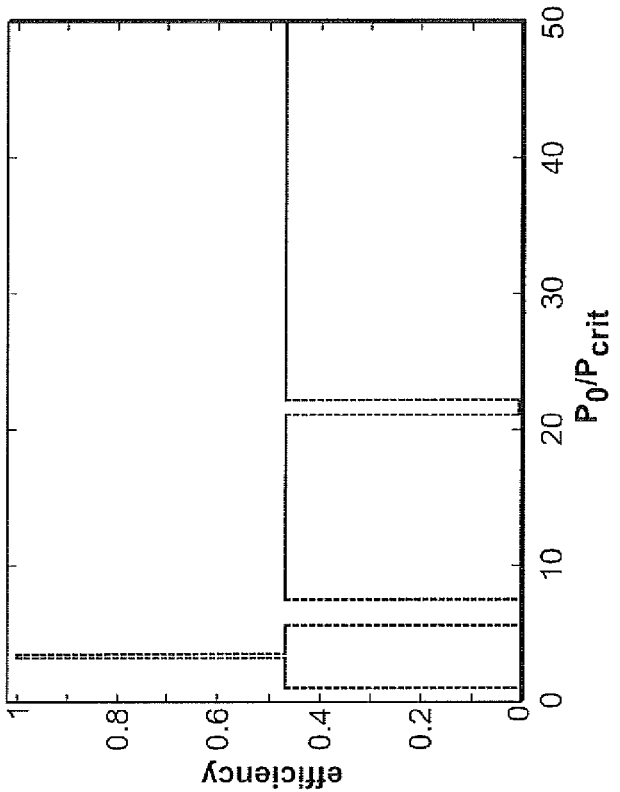
FIG. 11B
FIG. 11A

NONLINEAR HARMONIC GENERATION AND DEVICES IN DOUBLY-RESONANT KERR CAVITIES

PRIORITY INFORMATION

This application claims priority from provisional application Ser. No. 61/055,804 filed May 23, 2008, which is incorporated herein by reference in its entirety.

SPONSORSHIP INFORMATION

This invention was made with Government support under Grant No. W911NF-07-D-0004, awarded by the Army Research Office. The Government has certain rights in this invention.

BACKGROUND OF THE INVENTION

The invention is related to the field of doubly-resonant Kerr cavities, and in particular to nonlinear harmonic generation and devices in doubly-resonant Kerr cavities.

Nonlinear frequency conversion has been commonly realized in the context of waveguides, or even for free propagation in the nonlinear materials, in which light at one frequency co-propagates with the generated light at the harmonic frequency. A phase-matching condition between the two frequencies must be satisfied in this case in order to obtain efficient conversion. Moreover, as the input power is increased, the frequency conversion eventually saturates due to competition between up and down conversion. Frequency conversion in a doubly resonant cavity has three fundamental differences from this familiar case of propagating modes.

First, light in a cavity can be much more intense for the same input power, because of the spatial (modal volume V) and temporal (lifetime Q) confinement. We show that this enhances second-harmonic ($\chi^{(2)}$) conversion by a factor of $Q^3/V$ and enhances third-harmonic ($\chi^{(3)}$) conversion by a factor of $Q^2/V$. Second, there is no phase-matching condition per se for 100% conversion; the only absolute requirement is that the cavity support two modes of the requisite frequencies. However, there is a constant factor in the power that is determined by an overlap integral between the mode field patterns; in the limit of a very large cavity, this overlap integral recovers the phase-matching condition for ($\chi^{(2)}$) processes. Third, the frequency conversion no longer saturates instead, it peaks (at 100%, with proper design) for a certain critical input power satisfying a resonant condition, and goes to zero if the power is either too small or too large.

Second-harmonic generation in cavities with a single resonant mode at the pump frequency or the harmonic frequency requires much higher power than a doubly resonant cavity, approaching one Watt and/or requiring amplification within the cavity. A closely related case is that of sum-frequency generation in a cavity resonant at the two frequencies being summed. Second-harmonic generation in a doubly resonant cavity, with a resonance at both the pump and harmonic frequencies, has most commonly been analyzed in the low-efficiency limit where nonlinear down-conversion can be neglected, but down-conversion has also been included by some authors.

Here, one can show that not only is down-conversion impossible to neglect at high conversion efficiencies (and is, in fact, necessary to conserve energy), but also that it leads to a critical power where harmonic conversion is maximized. This critical power was demonstrated numerically in a sub-optimal geometry where 100% efficiency is impossible, but does not seem to have been clearly explained theoretically.

SUMMARY OF THE INVENTION

According to one aspect of the invention, there is provided a nonlinear harmonic generation system comprising. The nonlinear harmonic generation system includes a waveguide channel receives and propagates electromagnetic signals. A resonant cavity is coupled to the waveguide channel. The resonant cavity structure includes a plurality of resonant modes into which electromagnetic energy is coupled during the operation of the system. One of the resonant modes includes a resonant frequency that changes during operation of the system to reach either an input-signal frequency or a harmonic frequency for a majority of the time in which harmonic generation is occurring. Both reflected and harmonic fields are emitted back into the waveguide channel so as to allow efficient harmonic generation at a specified critical input power.

According to another aspect of the invention, there is provided a method of performing nonlinear harmonic conversion. The method includes positioning a waveguide channel for receiving and propagating electromagnetic signals. Also, the method includes coupling a resonant cavity to the waveguide channel. The resonant cavity structure includes a plurality of resonant modes into which electromagnetic energy is coupled during the operation of the system. Moreover, the method includes changing the frequency of one of the resonant modes during operation of the system to reach either an input-signal frequency or a harmonic frequency for a majority of the time in which harmonic generation is occurring. Both reflected and harmonic fields are emitted back into the waveguide channel so as to allow efficient harmonic generation at a specified critical input power.

According to another aspect of the invention, there is provided an oscillator system. The oscillator system includes a waveguide channel for receiving and propagating electromagnetic signals. A resonant cavity is coupled to the waveguide channel. The resonant cavity structure includes a plurality of resonant modes into which electromagnetic energy is coupled during the operation of the system. The resonant modes are coupled by a Kerr nonlinearity, where reflected fields are emitted back into the waveguide channel with a specified power having oscillations that include a frequency substantially lower than any frequency of the input electromagnetic wave.

BRIEF DESCRIPTION OF THE DRAWINGS

FIGS. 11A-11B are graphs illustrating steady-state efficiency at point C in FIG. 4 as a function of the transient input-pulse power $P_0$ from FIG. 10.

DETAILED DESCRIPTION OF THE INVENTION

Figure 1A:
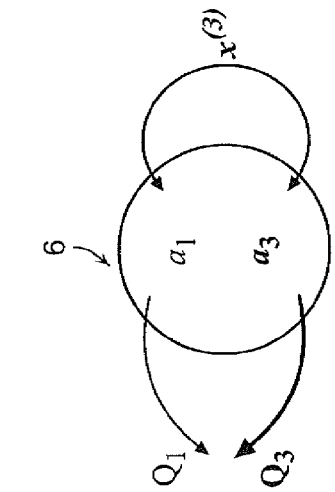
FIGS. 1A-1B are schematic diagrams illustrating a general scheme for third-harmonic generation, and dynamical variables for coupled-mode equations.
Figure 1A:
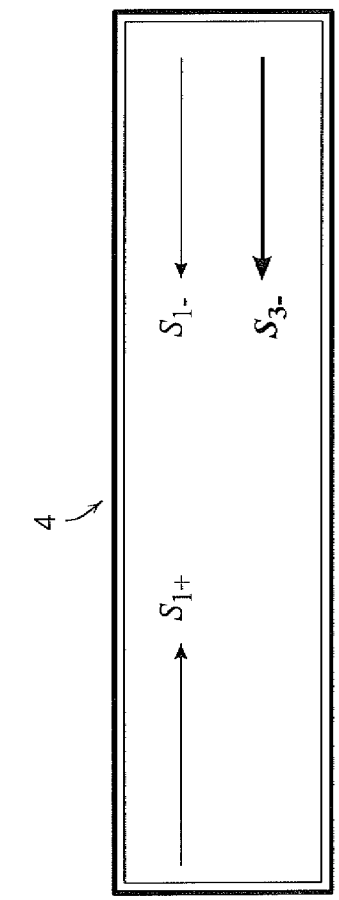

The invention provides an approach to achieving 100% third-harmonic conversion in doubly-resonant optical cavities with Kerr nonlinearities, even when dynamical stability and self-phase modulation (which can drive the cavities out of resonance) are included, and describe the initial conditions required to excite these efficient solutions.

In particular, one can show that such doubly-resonant nonlinear optical systems can display a rich variety of dynamical behaviors, including multistability, (such as different steady states excited by varying initial conditions, a richer version of the bistable phenomenon observed in single-mode cavities), gap solitons, long-period limit cycles (similar to the "self-pulsing" observed for second-harmonic generation), and transitions in the stability and multiplicity of solutions as the parameters are varied. One reason is doubly resonant cavities lower the power requirements for nonlinear devices, and in particular for third harmonic conversion, compared to singly-resonant cavities or nonresonant structures. An appreciation and understanding of these behaviors is important to design efficient harmonic converters, but it also opens the possibility of new types of devices enabled by other aspects of the nonlinear dynamics. For example, strong Kerr nonlinearities are desired in the context of quantum information theory for use in low-loss photon entanglement and other single-photon applications.

In a Kerr ($\chi^{(3)}$) medium, there is a change in the refractive index proportional to the square of the electric field; for an oscillating field at a frequency w, this results in a shift in the index at the same frequency (self-phase modulation, SPM), generation of power at the third-harmonic frequency $3\omega$, and also other effects when multiple frequencies are present [cross-phase modulation (XPM) and four-wave mixing (FWM)]. When the field is confined in a cavity, restricting to a small modal volume V for a long time given by the quality factor Q (a lifetime in units of the optical period), such nonlinear effects are enhanced by both the increased field strength for the same input power and by the frequency sensitivity inherent in resonant effects (since the fractional bandwidth is 1/Q). This enhancement is exploited, for example, in nonlinear harmonic and sum-frequency generation, most commonly for $\tau^{(2)}$ effects where the change in index is proportional to the electric field, which requires a non-centrosymmetric material.

One can further enhance harmonic generation by using a cavity with two resonant modes, one at the source frequency and one at the harmonic frequency In this case, one must also take into account a nonlinear down-conversion process that competes with harmonic generation, but it turns out to be theoretically possible to obtain 100% harmonic conversion for either $\tau^{(2)}(\omega \to 2\omega)$ or $\tau^{(3)}(\omega \to 3\omega)$ nonlinearities at a specific "critical" input power $P_{crit}$, both in an one-dimensional model of propagating waves for $\chi^{(2)}$ nonlinearities and also in a more general coupled-mode model for either $\chi^{(2)}$ or $\chi^{(3)}$ nonlinearities.

In particular, the harmonic-generation and downconversion processes are analyzed in a broad class of model systems depicted in FIG. 1A. In particular, FIG. 1A shows a schematic diagram of the general system 2 for third-harmonic generation by a doubly resonant cavity 6, and dynamical variables for coupled-mode equations. A single input (or output) channel structure 4, with incoming $S_{1+}$ and outgoing field amplitudes $S_{1-}$ and $S_{3-}$, is coupled to a resonant cavity 6 with two modes at frequencies $\omega_1$ and $3\omega_1$ (and corresponding amplitudes $a_1$ and $a_3$). In other embodiments of the invention, a plurality of input (or output) channels can be used.

The two resonant modes are nonlinearly coupled by a Kerr ($\chi^{(3)}$) nonlinearity. The input channel structure 4 can include any standard waveguide structure for guiding an electromagnetic signal. The incoming and outgoing amplitude $S_{1+}$, $S_{1-}$ and $S_3$ are associated with reflected and harmonic fields are emitted back into the input channel 4. The lifetimes Q1, Q2 are associated with amplitudes $a_1$, $a_3$ of the two resonant modes in the resonant cavity 6. In accordance with the invention, 100% harmonic generation is predicted at a critical power $P_{crit}$ proportional to $V/Q^3$ for $\chi^{(2)}$ and $V/Q^2$ for $\chi^{(3)}$. However, the steady-state solution of the system is analyzed and not its dynamics or stability. Moreover, in the $\chi^{(3)}$ case there can also be an SPM and XPM effect that shifts the cavity frequencies out of resonance and spoils the harmonic-generation effect. Both of these effects are considered, describe how to compensate for SPM and XPM, and demonstrate the different regimes of stability in such $\chi^{(3)}$ doubly resonant systems. One can show that the parameters and the initial conditions must be chosen within certain regimes to obtain a stable steady state with high conversion efficiency.

The resonant cavity 6 can have a plurality of resonant modes into which electromagnetic energy is coupled during the operation of the system 2. One of the resonant modes includes a resonant frequency that changes during operation of said system 2 to reach either an input-signal frequency or a harmonic frequency for a majority of the time in which harmonic generation is occurring. Both reflected and harmonic fields are emitted back into said input channel 4 so as to allow efficient harmonic generation at a specified critical input power. This system 2 can include harmonic-generation efficiency between 20-100%.

Figure 1B:
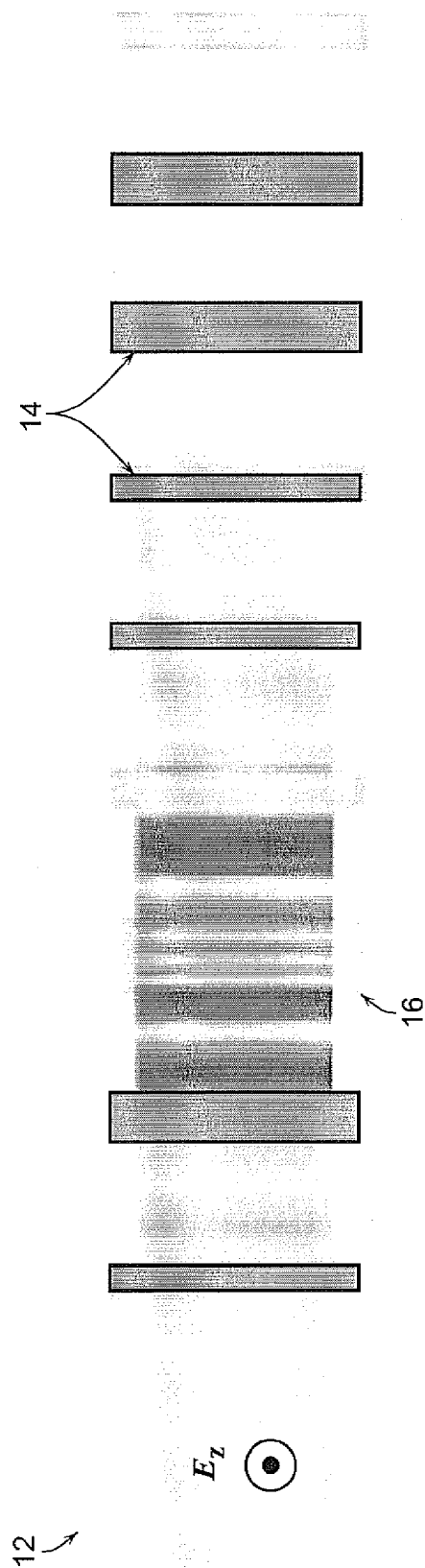

FIG. 1B shows an example 12 of the invention in one dimension, using a semi-infinite quarter-wave stack of dielectric layers 14 with a doubled-layer defect (resonant cavity) 15 that is coupled to incident plane waves; the electric field $E_z$ of a steady-state $3\omega_1$ solution is shown for negative, zero, and positive respectively.

In other regimes, one can demonstrate radically different behaviors: not only low-efficiency steady states, but also limit-cycle solutions where the efficiency oscillates slowly with a repetition period of many thousands of optical cycles. With infrared light, these limit cycles form a kind of optical oscillator (clock) with a period in the hundreds of GHz or THz (and possibly lower, depending on the cavity parameters). Previously, limit-cycle (self-pulsing) behaviors have been observed in a number of other nonlinear optical systems, such as: doubly-resonant $\chi^{(2)}$ cavities coupled by second-harmonic generation; bistable multimode Kerr cavities with time-delayed nonlinearities; nonresonant distributed feedback in Bragg gratings; and a number of nonlinear lasing devices.

However, the system considered in this invention seems unusually simple, especially among $\chi^{(3)}$ systems, in that it only requires two modes and an instantaneous Kerr nonlinearity, with a constant-frequency input source, to attain self-pulsing, and partly as a consequence of this simplicity the precise self-pulsing solution is quite insensitive to the initial conditions. In other nonlinear optical systems where self-pulsing was observed, others have also observed chaotic solutions in certain regimes. Here, chaos is not observed for any of the parameter regimes considered, where the input was a constant-frequency source, but it is possible that chaotic solutions may be excited by an appropriate pulsed input as in the $\chi^{(2)}$ case.

Another interesting phenomenon that can occur in nonlinear systems is multistability, where there are multiple possible steady-state solutions that one can switch among by varying the initial conditions. In Kerr $\chi^{(3)}$ media, an important example of this phenomenon is bistable transmission through nonlinear cavities: for transmission through a single-mode cavity, output can switch discontinuously between a high-transmission and a low-transmission state in a hysteresis effect that results from SPM. For example, if one turns on the power gradually from zero the system stays in the low-transmission state, but if the power is increased further and then decreased to the original level, the system can be switched to the high-transmission state. This effect, which has been observed experimentally, can be used for all-optical logic, switching, rectification, and many other functions. In a cavity with multiple closely-spaced resonances, where the nonlinearity is strong enough to shift one cavity mode's frequency to another's, the same SPM phenomenon can lead to more than two stable solutions. Here, one can demonstrate a much richer variety of multistable phenomena in the doubly-resonant case for widely-separated cavity frequencies coupled by harmonic generation in addition to SPM not only can there be more than two stable states, but the transitions between them can exhibit complicated oscillatory behaviors as the initial conditions are varied, and there are also Hopf bifurcations into self-pulsing solutions.

The basic theory of frequency conversion in doubly-resonant cavities with $\chi^{(3)}$ nonlinearities, including the undesirable self- and cross-phase modulation effects are analyzed, and explain the existence of a solution with 100% harmonic conversion (without considering stability).

Consider a waveguide coupled to a doubly resonant cavity with two resonant frequencies $\omega_3^{cav}=\omega_1$ and $\omega_3^{cav}=\omega_3=3\omega_1$ (below, we will shift $\omega_k^{cav}$ to differ slightly from $\omega_k$), and corresponding lifetimes $\tau_1$ and $\tau_3$ describing their radiation rates into the waveguide (or quality factors $Q_k=\omega_k\tau_k/2$). In addition, these modes are coupled to one another via the Kerr nonlinearity. Because all of these couplings are weak, any such system (regardless of the specific geometry), can be accurately described by temporal coupled-mode theory, in which the system is modeled as a set of coupled ordinary differential equations representing the amplitudes of the different modes, with coupling constants and frequencies determined by the specific geometry. In particular, the coupled-mode equations for this particular class of geometries are commonly known along with explicit equations for the coupling coefficients in a particular geometry. The degrees of freedom are the field amplitude $a_k$ of the kth cavity mode (normalized so that $|a_k|$ is the corresponding energy) and the field amplitude $s_{k\pm}$ of the incoming (+) and outgoing (−) waveguide modes at $\omega_k$ (normalized so that $|s_{k\pm}|^2$ is the corresponding power), as depicted schematically in FIG. 1A. These field amplitudes are coupled by the following equations (assuming that there is only input at $\omega_1$, i.e. $s_{3+}=0$):

$$\dot{a}_1 = \left[i\omega_1^{cav}(1-\alpha_{11}|a_1|^2 - \alpha_{13}|a_3|^2) - \frac{1}{\tau_1}\right]a_1 - i\omega_1\beta_1(a_1^*)^2 a_3 + \sqrt{\frac{2}{\tau_{s,1}}}s_{1+} \quad \text{EQ. 1}$$

$$\dot{a}_3 = \left[i\omega_3^{cav}(1-\alpha_{31}|a_1|^2 - \alpha_{33}|a_3|^2) - \frac{1}{\tau_3}\right]a_3 - i\omega_3\beta_3 a_1^3 \quad \text{EQ. 2}$$

The $\alpha$ and $\beta$ coefficients are geometry and material-dependent constants that express the strength of various nonlinear effects for the given modes. The $\alpha_{ij}$ terms describe self- and cross-phase modulation effects: they clearly give rise to effective frequency shifts in the two modes. The $\beta_l$ term characterize the energy transfer between the modes: the $\beta_3$ term describes frequency up-conversion and the $\beta_1$ term describes down-conversion. As shown, they are related to one another via conservation of energy $\omega_1\beta_1=\omega_3\beta_3^*$, and all of the nonlinear coefficients scale inversely with the modal volume V.

There are three different $\alpha_{ij}$ parameters (two SPM coefficients $\alpha_{11}$ and $\alpha_{33}$ and one XPM coefficient $\alpha_{13}=\alpha_{31}$). All three values are different, in general, but are determined by similar integrals of the field patterns, produce similar frequency-shifting phenomena, and all scale as 1/V. Therefore, in order to limit the parameter space analyzed in the invention, one can consider the simplified case where all three frequency-shifting terms have the same strength $\alpha_{ij}=\alpha$ is considered.

One can also include various losses, e.g. linear losses correspond to a complex $\omega_1$ and/or $\omega_3$, and nonlinear two-photon absorption corresponds to a complex $\alpha$. It is found that such considerations do not qualitatively change the results, only reducing the efficiency somewhat, as long as the losses are not too big compared to the radiative lifetimes; and so in this case the invention is restricted to the idealized lossless case.

Figure 2:
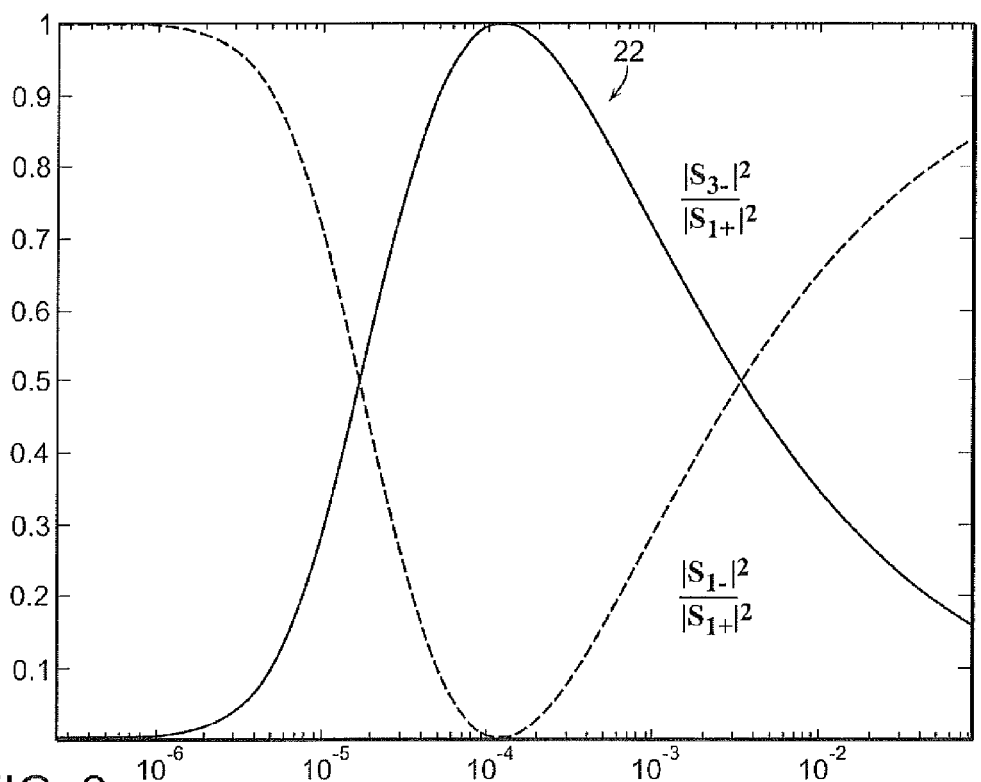
FIG. 2 is a graph illustrating the steady-state efficiency of third-harmonic generation.

FIG. 2 shows the steady-state conversion efficiency ($|s_{3-}|^2/|s_{1+}|^2$) versus input power of light that is incident on the cavity at $\omega_1^{cav}$, for the same parameter regime, assuming negligible self- and cross-phase modulation so that $\alpha=0$), and not considering the stability of the steady state. As shown by the plot 22, as one increases the input power, the efficiency increases, peaking at 100% conversion for a critical input power $P_{crit=|s_{1+}^{crit}|}$, where $$|s_{1+}^{crit}| = \left(\frac{4}{|\omega_1\beta_1|^2\tau_1^3\tau_3}\right)^{1/4}. \quad \text{EQ. 3}$$

The efficiency decreases if the power is either too low (in the linear regime) or too high (dominated by down-conversion). $P_{crit}$ scales as $V/Q^2$, so one can in principle obtain very low-power efficient harmonic conversion by increasing Q and/or decreasing V. Including absorption or other losses decreases the peak efficiency, but does not otherwise qualitatively change this solution.

Figure 3:
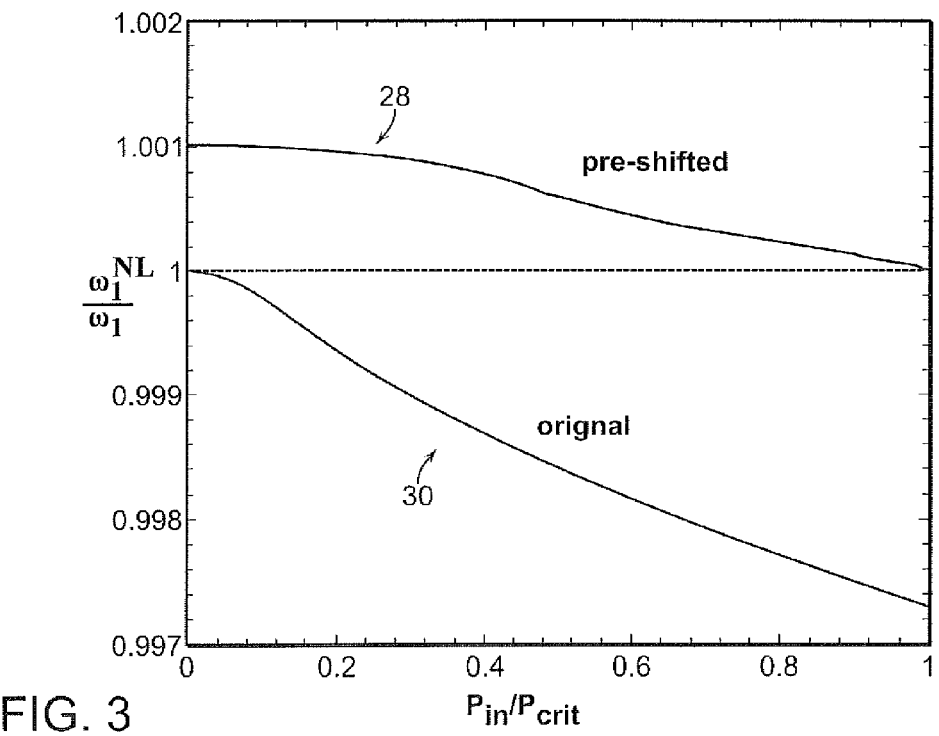
FIG. 3 is a graph illustrating a shift in the resonant frequency as a function of input power, due to self- and cross-phase modulation.

There are two effects not previously not analyzed in detail, however, which can degrade this promising solution: nonlinear frequency shifts and instability. Here, the frequency shifts are first considered, which arise whenever $\alpha \neq 0$, and consider stability hereinafter. The problem with the $\alpha$ terms is that efficient harmonic conversion depends on the cavities being tuned to harmonic frequencies $\omega_3 = 3\omega_1$; a nonlinear shift in the cavity frequencies due to self- and cross-phase modulation will spoil this resonance. In principle, there is a straightforward solution to this problem, as depicted in FIG. 3. Originally (for $\alpha=0$), the cavity was designed to have the frequency $\omega_1$ in the linear regime, but with $\alpha=0$ the effective cavity frequency $\omega_1^{NL}$ (including self- and cross-phase modulation terms) is shifted away from the design frequency as shown by the plot 30. Instead, we can simply design the linear cavity to have a frequency $\omega_1^{cav}$ slightly different from the operating frequency $\omega_1$, so that self- and cross-phase modulation shifts $\omega_1^{NL}$ exactly to $\omega_1$ at the critical input power, as depicted by the plot 28 in FIG. 3. Exactly the same strategy is used for $\omega_3^{NL}$, by pre-shifting $\omega_3^{cav}$.

More precisely, to compute the required amount of pre-shifting, one can examine the coupled-mode equations EQs. (1-2). First, one can solve for the critical power Petit assuming $\alpha=0$, and obtain the corresponding critical cavity fields a $\alpha_k^{crit}$:

$$|\alpha_1^{crit}|^2 = \left(\frac{1}{\omega_1^2|\beta_1|^2 \tau_3 \tau_{1,s}}\right)^{1/2} \quad \text{EQ 4}$$

$$|\alpha_3^{crit}|^2 = \left(\frac{\omega_3 \beta_3 \tau_3}{(\omega_1 \beta_1 \tau_{1,s})^3}\right)^{1/2} \quad \text{EQ. 4}$$

Then, these critical fields are substituted into the coupled-mode equations for $\alpha \cdot 0$, and solve for the new cavity frequencies $\omega_k^{cav}$ so as to cancel the terms and make the $\alpha_k^{crit}$ solutions still valid. This yields the following transformation of the cavity frequencies:

$$\omega_1^{cav} = \frac{\omega_1}{1 - \alpha_{11}|a_1^{crit}|^2 - \alpha_{13}|a_3^{crit}|^2} \quad \text{EQ. 6}$$

$$\omega_3^{cav} = \frac{\omega_3}{1 - \alpha_{13}|a_1^{crit}|^2 - \alpha_{33}|a_3^{crit}|^2}. \quad \text{EQ. 7}$$

By inspection, when substituted into EQs. (1-2) at the critical power, these yield the same steady-state solution as for $\alpha=0$. There are two other appearances of $\omega_1$ and $\omega_3$ in the coupled-mode equations, in the $\beta_k$ terms, but we need not change these frequencies because that is a higher-order effect, and the derivation of the coupled-mode equations considered only first-order terms in $\chi^{(3)}$.

The nonlinear dynamics turn out to depend only on four dimensionless parameters: $\tau_3/\tau_1 = Q_3/3Q_1$, $\alpha_{11}/\beta_1$, $\alpha_{33}/\beta_1$, and $\alpha_{13}/\beta_1 = \alpha_{31}/\beta_1$. The overall scale of Q, $\alpha$ etcetera, merely determines the absolute scale for the power requirements: it is clear from the equations that multiplying all $\alpha$ and $\beta$ coefficients by an overall constant K can be compensated by dividing all $\alpha$ and s amplitudes by $\sqrt{K}$, which happens automatically for s at the critical power by EQ. (3); the case of scaling $\tau_{1,3}$ by an overall constant is more subtle and is considered below. As mentioned above, for simplicity we take $\alpha_{11} = \alpha_{33} = \alpha_{13} = \alpha_{31} = \alpha$. Therefore, in the subsequent sections we will analyze the asymptotic efficiency as a function of $\tau_3/\tau_1$ and $\alpha/\beta_1$.

So far, a steady-state solution as been found to the coupled-mode equations, including self- and cross-phase modulation, which achieves 100% third-harmonic conversion.

To understand the dynamics and stability of the nonlinear coupled-mode equations, one can apply the standard technique of identifying fixed points of the equations and analyzing the stability of the linearized equations around each fixed point.

By a "fixed point," corresponds to a steady-state solution to an input frequency $\omega_1$ ($s_1 + \sim e^{-i\omega_1 t}$) and hence $\alpha_1(t) = A_1 e^{-i\omega_1 t}$ and $\alpha_3(t) = A_3 e^{-i3\omega_1 t}$ for some unknown constants $A_1$ and $A_3$. An input frequency $\omega_1$ can also generate higher harmonics, such as $9\omega_1$ or $5\omega_1$, but these are negligible: both because they are higher-order effects ($\sim [\omega^{(3)}]^2$, and all such terms were dropped in deriving the coupled-mode equations, and because it is assumed there is no resonant mode present at those frequencies. By substituting this steady-state form into EQs. (1-2), one obtains two coupled polynomial equations whose roots are the fixed points. One of the fixed points is known, the 100% efficiency solution, but to fully characterize the system one would like to know all of the fixed points (both stable and unstable). One can solved these polynomial equations using Mathematica, which is able to compute all of the roots, but some transformations were required to put the equations into a solvable form.

As mentioned above, the dynamics are independent of the overall scale of $\tau_{1,3}$, and depend only on the ratio $\tau_3/\tau_1$. This can be seen from the equations for $A_{1,3}$, in which the $\omega_{1,3}$ oscillation has been removed. In these equations, if one can multiply $\tau_1$ and $\tau_3$ by an overall constant factor K, after some algebra it can be shown that the $A_{1,3}$ equations are invariant if we rescale $A_1 \rightarrow A_1/\sqrt{K}$, $A_3 \rightarrow A_3/\sqrt{K}$, rescale time $t \rightarrow Kt$, and rescale the input $s_1 \rightarrow s_1+/K$, which happens automatically for the critical power by EQ. (3). Note also that the conversion efficiency $|s_{3-}/s_{1+}|^2 = (2/\tau_3)|A_3/s_{1+}|^2$ is also invariant under this resealing by K. That is, the powers and the timescales of the dynamics change if you change the lifetimes, unsurprisingly, but the steady states, stability, etcetera are unaltered.

Given the steady-state solutions (the roots), their stability is determined by linearizing the original equations around these points to a first-order linear equation of the form $dx/dt = Ax$; a stable solution is one for which the eigenvalues of A have negative real parts (leading to solutions that decay exponentially towards the fixed point).

Figure 4:
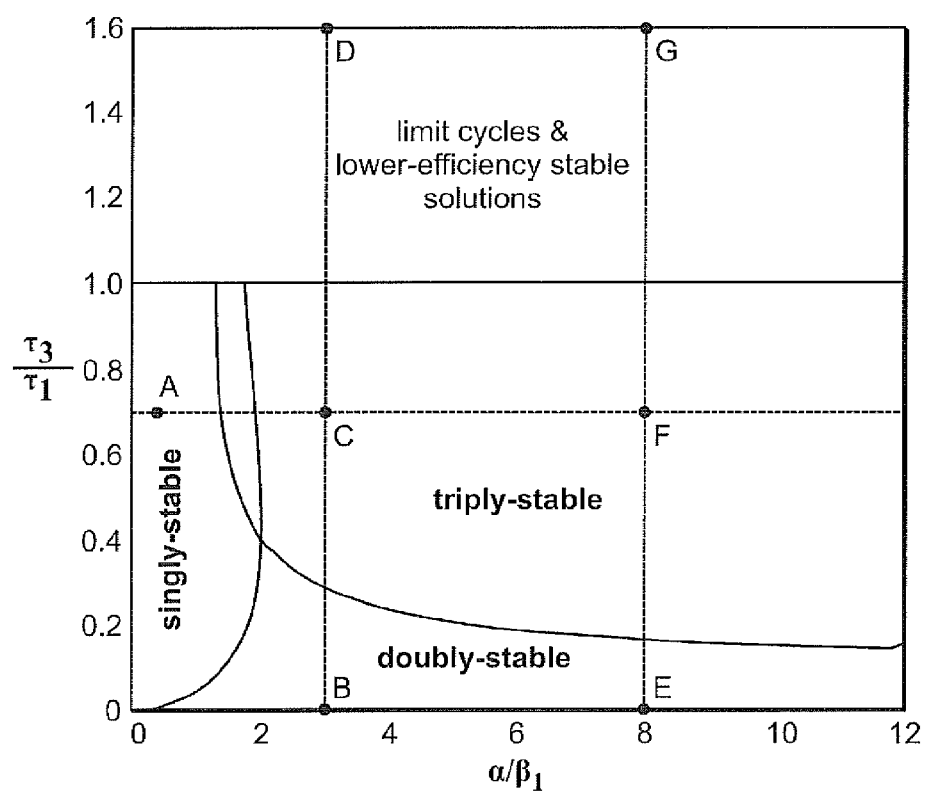
FIG. 4 is a phase diagram illustrating the nonlinear dynamics of the inventive doubly-resonant nonlinear harmonic generation system.

The results of this fixed-point and stability analysis are shown in FIG. 4 as a "phase diagram" of the system as a function of the relative lifetimes $\tau_3/\tau_1 = 3Q_3/Q_1$ and the relative strength of self-phase-modulation vs. four-wave mixing $\alpha/\beta_1$. The original 100%-efficiency solution is always present, but is only stable for $\tau_3 < \tau_1$ and becomes unstable for $\tau_3 > \tau_1$. The transition point, $\tau_3 = \tau_1$, corresponds to equal energy $|a_1|^2 = |a_3|^2$ in the fundamental and harmonic mode at the critical input power. The unstable region corresponds to $|a_3|^2 > |a_1|^2$ (and the down-conversion term is stronger than the up-conversion term)—intuitively, this solution is unstable because, if any perturbation causes the energy in the harmonic mode to decrease, there is not enough pumping from up-conversion to bring it back to the 100%-efficiency solution. Conversely, in the stable $|a_3| < |a_1|^2$ (13<11) regime, the higher-energy fundamental mode is being directly pumped by the input and can recover from perturbations. Furthermore, as $\alpha/\beta_1$ increases, additional lower-efficiency stable solutions are introduced, resulting in regimes with two (doubly stable) and three (triply stable) stable fixed points.

Figure 5:
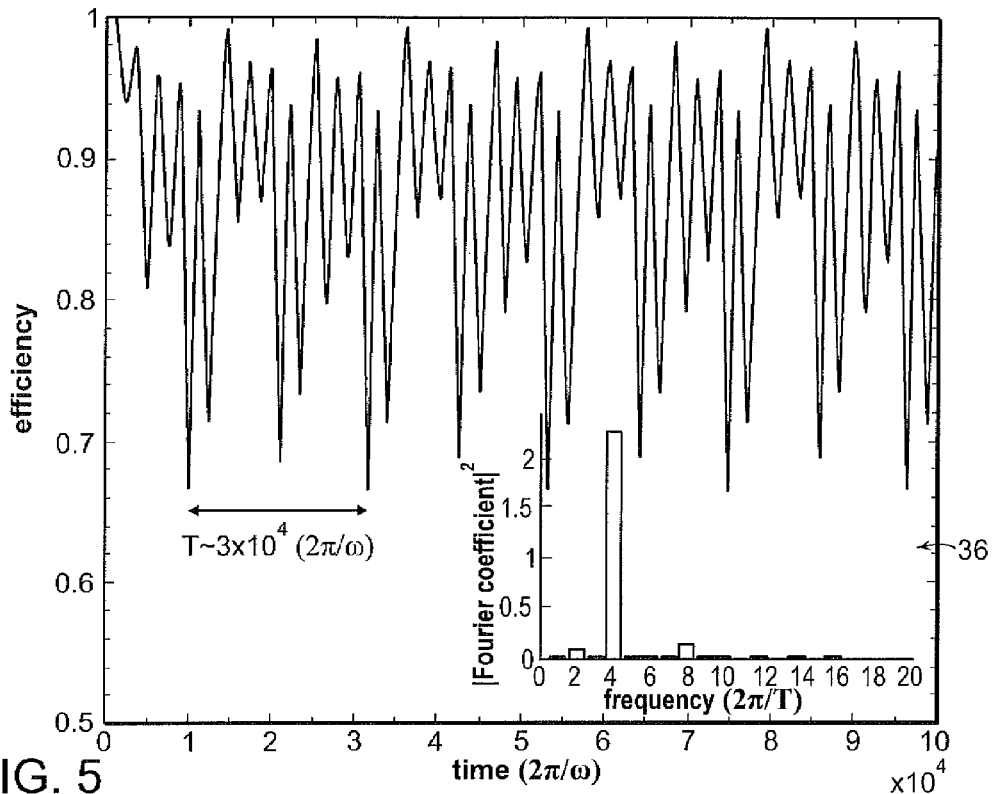
FIG. 5 is a graph illustrating an example of a limit-cycle solution, with periodically oscillating harmonic-generation efficiency as a function of time.

For $\tau_3 > \tau_1$, the 100%-efficiency solution is unstable, but there are lower-efficiency steady-state solutions and also another interesting phenomenon: limit cycles. A limit cycle is a stable oscillating-efficiency solution, one example of which (corresponding to point D in FIG. 4) is plotted as a function time in FIG. 5. In general, the existence of limit cycles is difficult to establish analytically, but the phenomenon is clear in the numerical solutions as a periodic oscillation insensitive to the initial conditions. In fact, these limit cycles result from a "Hopf bifurcation," which is a transition from a stable fixed point to an unstable fixed point and a limit cycle.

In this example at point D in FIG. 4, the efficiency oscillates between roughly 66% and nearly 100%, with a period of several thousand optical cycles. As a consequence of the time scaling described herein, the period of such limit cycles is proportional to the i's. If the frequency $\omega_1$ were 1.55 µm, for a $Q_1$ of 500 optical cycles, this limit cycle would have a frequency of around 70 GHz, forming an interesting type of optical "clock" or oscillator. Furthermore, the oscillation is not sinusoidal and contains several higher harmonics as shown in the inset 36 of FIG. 5; the dominant frequency component in this case is the fourth harmonic (~280 GHz), but different points in the phase diagram yield limit cycles with different balances of Fourier components.

Figure 6:
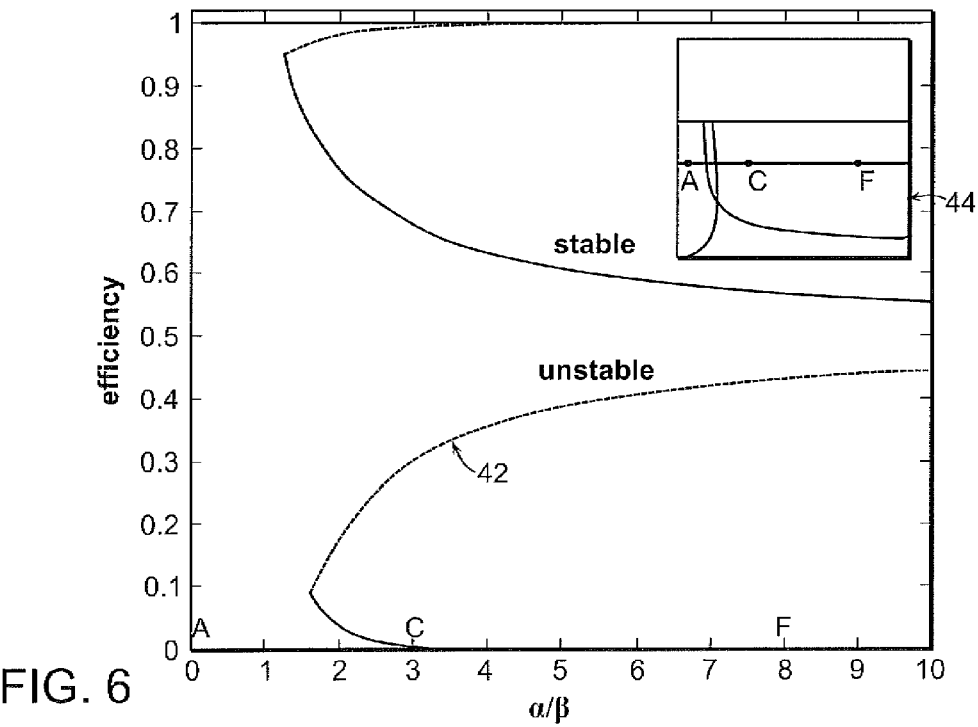
FIG. 6 is a bifurcation diagram showing the harmonic-generation efficiency of the stable and unstable steady-state solutions as a function of $\alpha/\beta_1$ for a fixed $\tau_3/\tau_1$.

To better understand the phase diagram of FIG. 4, it is useful to plot the efficiencies of both the stable and unstable solutions as a function of various parameters. Several of these bifurcation diagrams, in which new fixed points typically appear in stable-unstable pairs, are shown in FIGS. 6-8. To begin with, FIGS. 6 and 7 correspond to lines connecting the labeled points ACF, BCD, and ECG, respectively, in FIG. 4, showing how the stability changes as a function of $\alpha/\beta_1$ and $\tau_3/\tau_1$.

FIG. 6 shows how first one then two new stable fixed points appear as $\alpha/\beta_1$ is increased, one approaching zero efficiency and the other closer to 50%. Along with these two stable solutions appear two unstable solutions 42. In particular, the fact that one of the unstable solutions approaches the 100%-efficiency stable solution causes the latter to have a smaller and smaller basin of attraction as $\alpha/\beta_1$ increases, making it harder to excite. The inset 44 corresponds to the line ACF in FIG. 4.

Figure 7B:
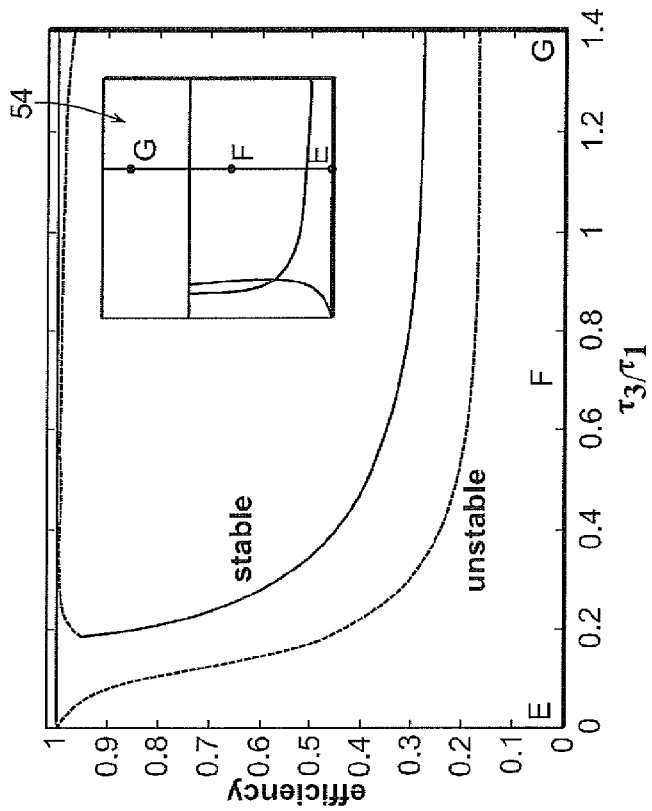
FIGS. 7A-7B are bifurcation diagrams showing the harmonic-generation efficiency of the stable and unstable steady-state solutions as a function of $\tau_3/\tau_1$ for a fixed $\alpha/\beta_1$ corresponding to the lines BCD or EFG, respectively, in FIG. 4.
Figure 7A:
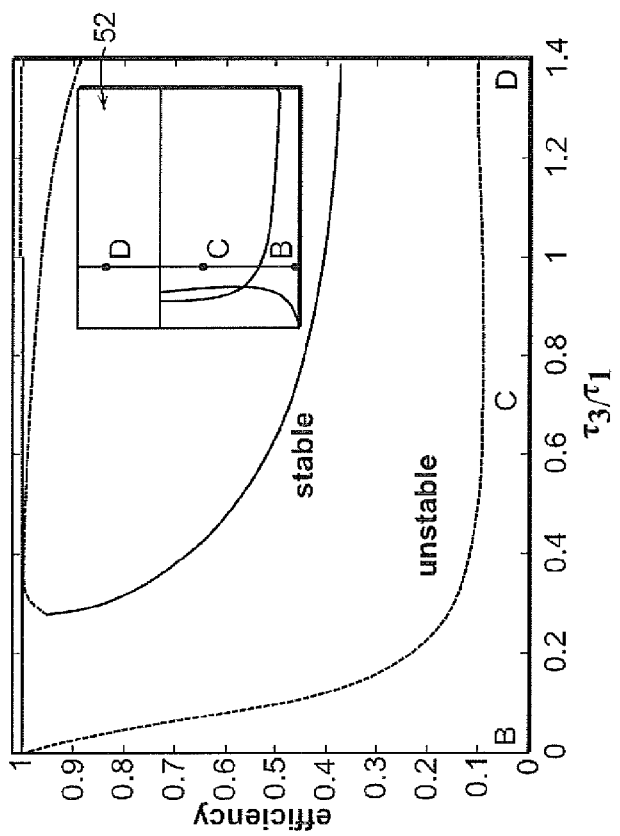

The next two plots, in FIGS. 7A-7B, both show the solutions with respect to changes in $\tau_3/\tau_1$ at two different values of $\alpha/\beta_1$. They demonstrate that at $\tau_1=\tau_3$, a Hopf bifurcation occurs where the 100%-efficiency solution becomes unstable for $\tau_3>\tau_1$ and limit cycles appear, intuitively seeming to "bounce between" the two nearby unstable fixed points. The actual phase space is higher dimensional, however, so the limit cycles are not constrained to lie strictly between the efficiencies of the two unstable solutions. It is worth to note that the remaining nonzero-efficiency stable solution (which appears at a nonzero $\tau_3/\tau_1$) becomes less efficient as $\tau_3/\tau_1$ increases. The insets 52 and 54 correspond to the lines BCD or EFG, respectively, in FIG. 4.

The above analysis and results were for the steady-state-solutions when operating at the critical input power to obtain a 100%-efficiency solution. However, one can, of course, operate with a different input power—although no other input power will yield a 100%-efficient steady-state solution, different input powers may still be useful because the 100%-efficiency solution may be unstable or practically unattainable.

Figures 8A, 8B:
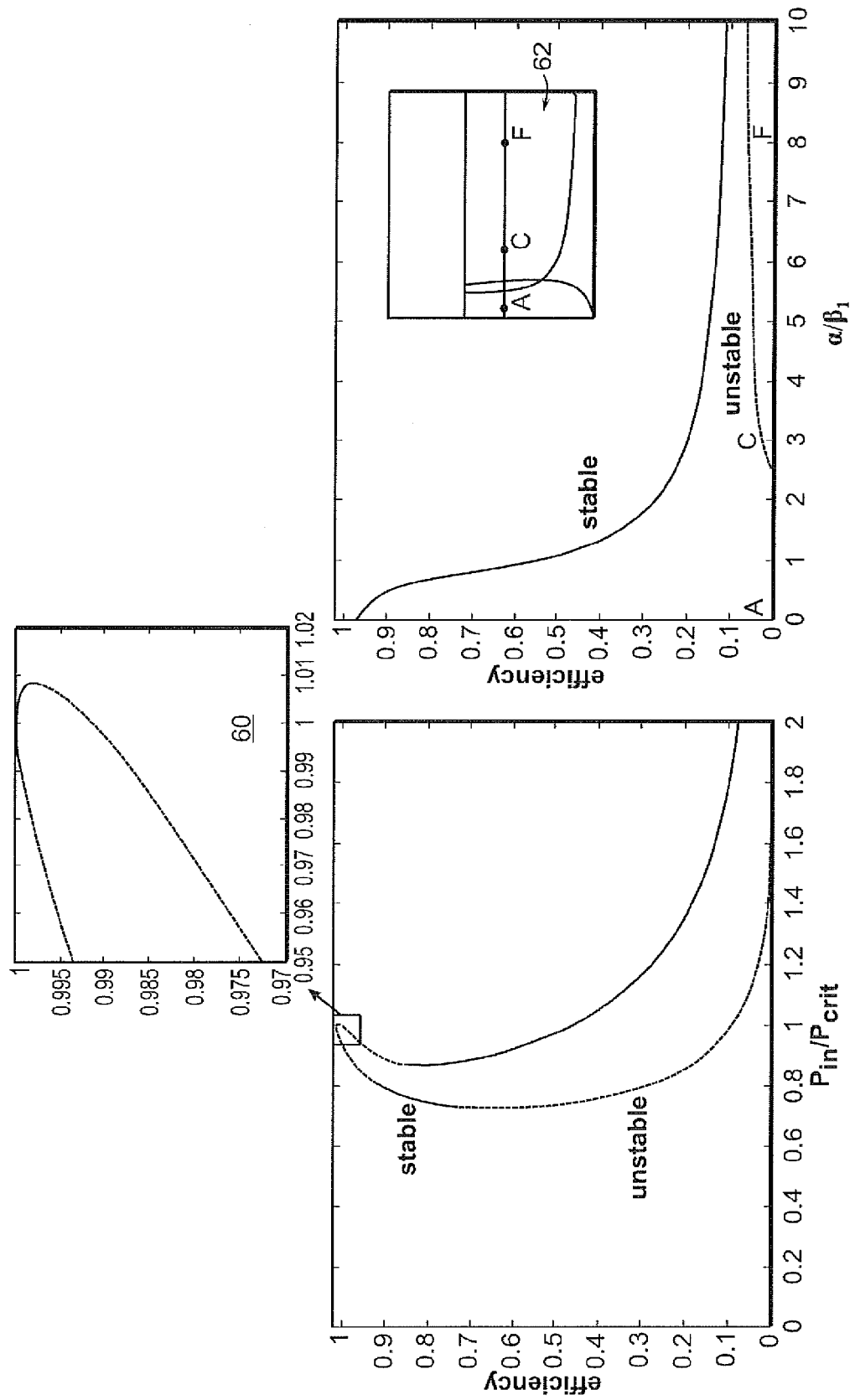
FIGS. 8A-8B are bifurcation diagrams showing the harmonic-generation efficiency of the stable and unstable steady-state solutions as a function of $\tau_3/\tau_1$ for a fixed $\alpha/\beta_1$ corresponding to point C, respectively, in FIG. 4.

FIG. 8A is the bifurcation diagram with respect to the input power $P_{in}/P_{crit}$ at fixed $\alpha/\beta_1$ and fixed $\tau_3/\tau_1$, corresponding to point C in FIG. 4 as shown in inset 60. This power bifurcation diagram displays a number of interesting features, with the steady-state solutions transitioning several times from stable to unstable and vice versa. The stability transitions in the uppermost branch are actually supercritical (reversible) Hopf bifurcations to/from limit cycles. Near the critical power, there is only a small region of stability of the near-100%-efficiency solution, as shown in the inset of FIG. 8(left).

In contrast, the lower-efficiency stable solutions have much larger stable regions of the curve while still maintaining efficiencies greater than 70% at low powers comparable to $P_{crit} \Box V/Q_2$, which suggests that they may be attractive regimes for practical operation when $\alpha/\beta_1$ is not small. This is further explored in the next section, and also by FIG. 8B which shows the bifurcation diagram along the line ACF in FIG. 4 as shown in inset 62 and similar to FIG. 6, but at 135% of the critical input power. For this higher power, the system becomes at most doubly stable as $\alpha/\beta_1$ is increased, and the higher-efficiency stable solution becomes surprisingly close to 100% as $\alpha/\beta_1 \rightarrow 0$.

Figure 9:
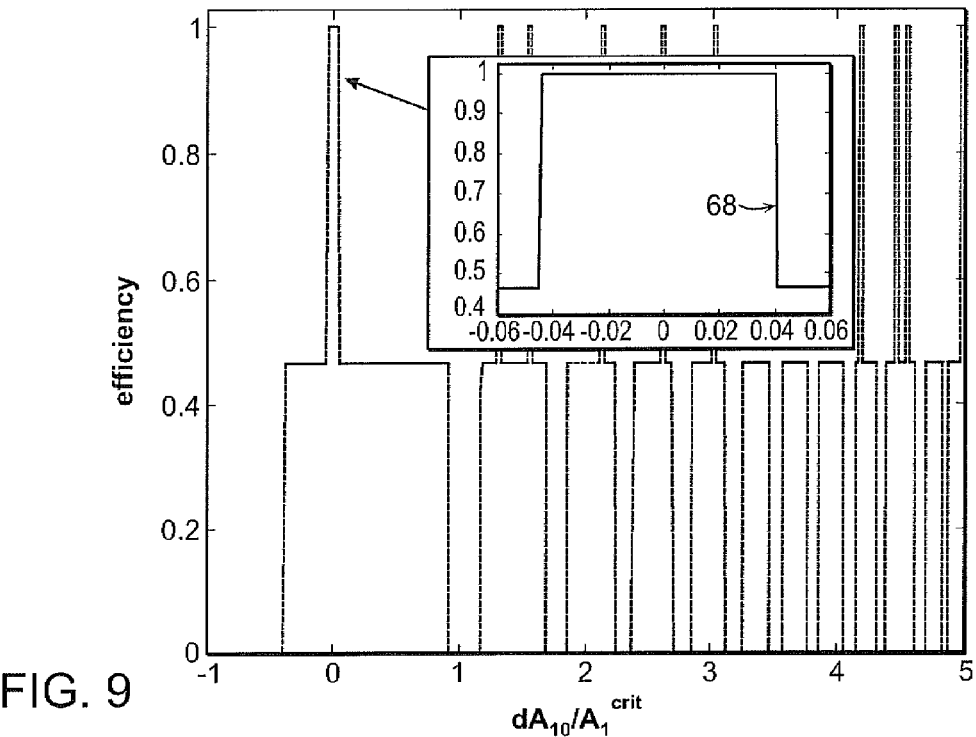
FIG. 9 is a graph illustrating asymptotic steady-state efficiency at point C in the phase diagram of FIG. 4, with the initial conditions perturbed from the 100%-efficiency stable solution.

One remaining concern in any multistable system is how to excite the desired solution—depending on the initial conditions, the system may fall into different stable solutions, and simply turning on the source at the critical input power may result in an undesired low-efficiency solution. If $\alpha/\beta_1$ is small enough, of course, then from FIG. 4 the high-efficiency solution is the only stable solution and the system must inevitably end up in this state no matter how the critical power is turned on. Many interesting physical systems will correspond to larger values of $\alpha/\beta_1$, however, and in this case the excitation problem is complicated by the existence of other stable solutions. Moreover, the basins of attraction of each stable solution may be very complicated in the phase space, as illustrated by FIG. 9, where varying the initial cavity amplitudes $\alpha/\beta_1$, from the 100%-efficiency solution causes the steady state to oscillate in a complicated way between the three stable solutions (at point C in FIG. 4) as shown in inset 68. The invention reviews several solutions to this excitation problem, and found an "adiabatic" excitation technique that reliably produces the high-efficiency solution without unreasonable sensitivity to the precise excitation conditions.

Figure 10:
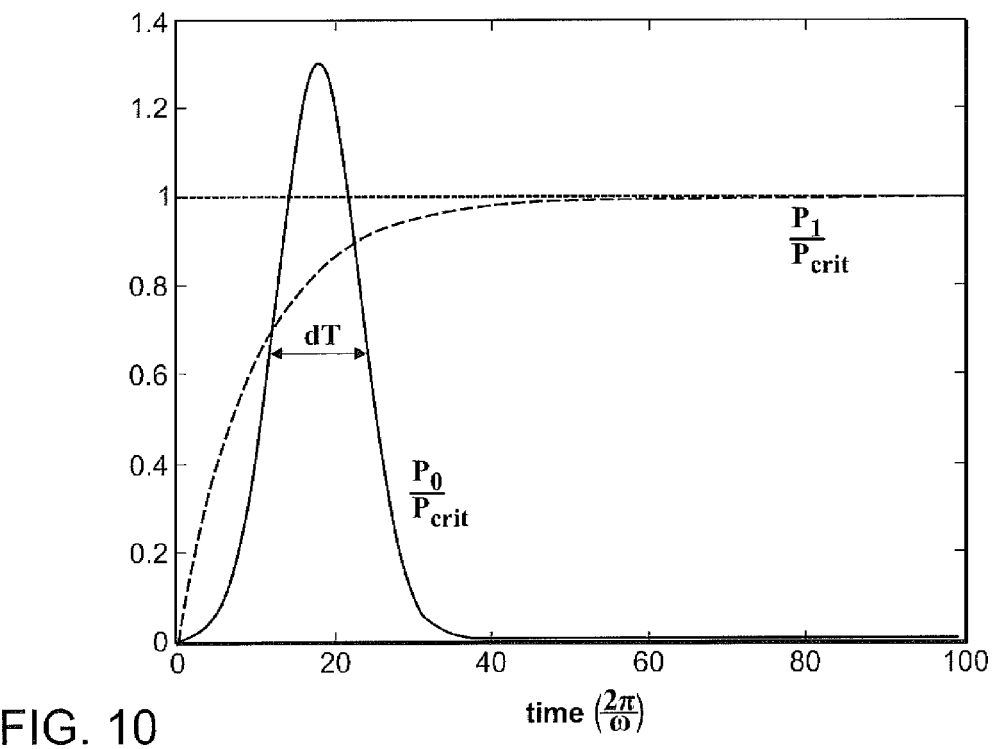
FIG. 10 is a graph illustrating a technique of exciting a resonant system into a controlled stable solution.

First, a simple technique is considered for exciting different solutions of a bistable filter: as shown in FIG. 10, one can "turn on" the input power by superimposing a gradual exponential turn-on (asymptoting to $P_1=P_{crit}$) with a Gaussian pulse of amplitude P0 and width $\delta T$. The function of the initial pulse is to "kick" the system into the desired stable solution. The eventual steady-state efficiency is computed, after all transient effects have disappeared, as a function of the pulse amplitude $P_0$ at point C in FIG. 4, where there are three stable solutions. The results are shown in FIG. 11A, and indeed one can see that all three stable solutions from point C in FIG. 6: one at near-zero efficiency, one at around 47% efficiency, and one at 100% efficiency. Unfortunately, the 100% efficiency solution is obviously rather difficult to excite, since it occurs for only a very narrow range of $P_0$ values. One approach to dealing with this challenge is to relax the requirement of 100% efficiency, which will never be obtained in practice anyway due to losses, and operate at a power $P_1<P_{crit}$.

In particular, FIG. 8A shows that there is a much larger stable region for $P1 \approx 0.8 P_{crit}$ with efficiency around 90%, leading one to suspect that this solution may be easier to excite than the 100%-efficiency solution at $P_1=P_{crit}$. This is indeed the case, as is shown in FIG. 11B, plotting efficiency vs. $P_0$ at point C with $P_1 9 \approx 0.8 P_{crit}$. In this case, there are only two stable solutions, consistent with FIG. 8B, and there are much wider ranges of $P_0$ that attain the high-efficiency ($\approx 90\%$) solution.

There are also many other ways to excite the high-efficiency solution (or whatever steady-state solution is desired). For example, because the cavity is initially de-tuned from the input frequency, much of the initial pulse power is actually reflected during the transient period, and a more efficient solution would vary the pulse frequency in time to match the cavity frequency as it detunes. One can also, of course, vary the initial pulse width or shape, and by optimizing the pulse shape one may obtain a more robust solution.

In particular, one can devise a different (constant-frequency) input pulse shape that robustly excites high-efficiency solution, insensitive to small changes in the initial conditions, by examining the power-bifurcation diagram in FIG. 8A in more detail. First, one can observe that input powers $1.45 P_{crit}$ have only one stable solution, meaning that this stable solution is ex cited regardless of the initial conditions or the manner in which the input power is turned on. Then, if one slowly decrease the input power, the solution must "adiabatically" follow this stable solution in the bifurcation diagram until a power $0.95 P_{crit}$ is reached, at which point that stable solution disappears. In fact, by inspection of FIG. 8A, at that point there are no stable solutions, and solution jumps into a limit cycle.

Figure 12B:
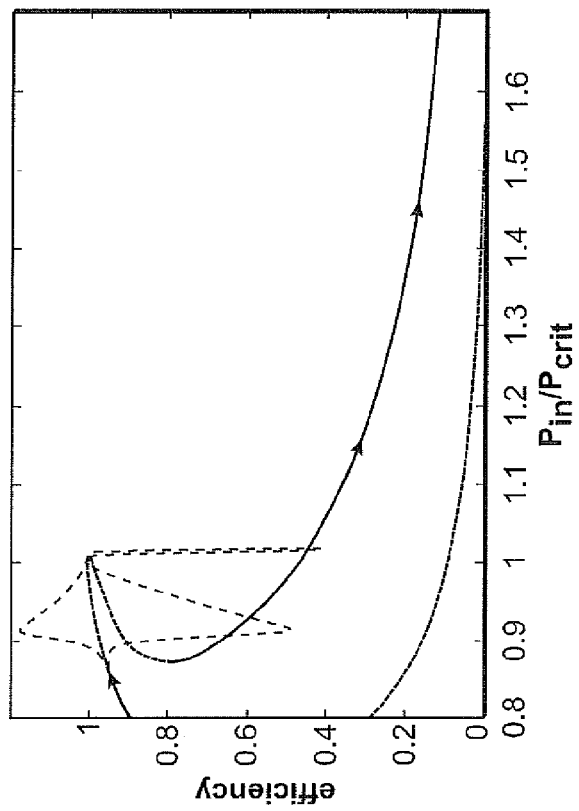
FIGS. 12A-12B are graphs illustrating the instantaneous efficiency as a function of input power, as the input power is slowly decreased.
Figure 12A:
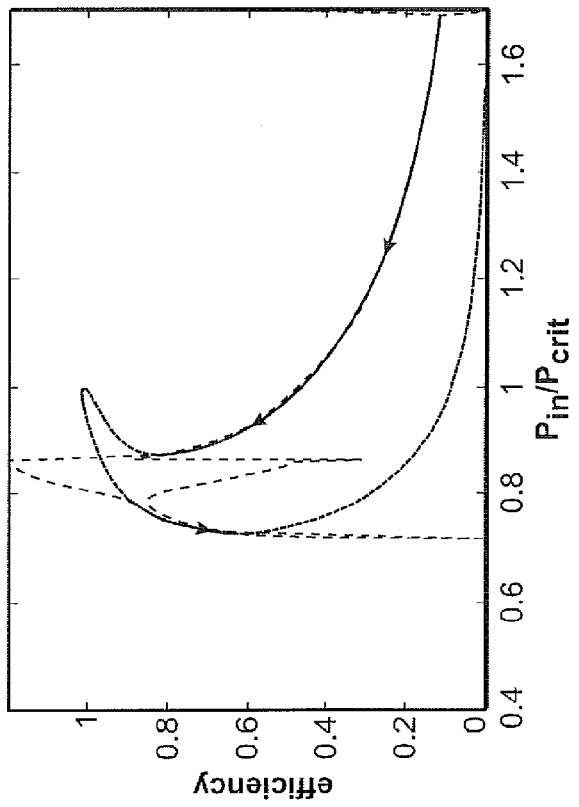

If the power is further decreased, a high-efficiency stable solution reappears and the system must drop into this steady state (being the only stable solution at that point). This process of gradually decreasing the power is depicted in FIG. 12A, where the instantaneous "efficiency" is plotted as a function of input power, as the input power is slowly decreased. The efficiency can exceed unity, because instantaneous output vs. input power is being plotted, and in the limit-cycle self-pulsing solution the output power is concentrated into pulses whose peak can naturally exceed the average input or output power. Already, this is an attractive way to excite a high-efficiency (>90%) solution, because it is insensitive to the precise manner in which one can change the power as long as it is changed slowly enough. This rate is determined by the lifetime of the cavity, and since this lifetime is likely to be sub-nanosecond in practice. It is not difficult to change the power "slowly" on that timescale. However, one can do even better, once one can attain this high-efficiency steady state, by then increasing the power adiabatically.

As power is increased, starting from the high-efficiency steady-state solution below the critical power, the system first enters limit-cycle solutions when the power becomes large enough that the stable solution disappears in FIG. 8B. As power is further increased, however, one can observe that these limit cycles always converge adiabatically into the 100%-efficiency solution when $P \rightarrow P_{crit}$. This process is shown in FIG. 12B. What is happening is actually a super-critical Hopf bifurcation at the two points where the upper branch changes between stable and unstable: this is a reversible transition between a stable solution and a limit cycle (initially small oscillations, growing larger and larger away from the transition). This is precisely what is observed in FIGS. 12A-12B, in which the limit cycle amplitudes become smaller and smaller as the stable solutions on either side of the upper branch are approached, leading to the observed reversible transitions between the two. The important fact is that, in this way, by first decreasing and then increasing the power to $P_{crit}$, one always obtains the 100%-efficiency solution regardless of the precise details of how the power is varied, as long as it is "slow" on the timescale of the cavity lifetime.

The invention demonstrates a doubly-resonant cavity not only has high-efficiency harmonic conversion solutions for low input power, but also exhibits a number of other interesting phenomena. First, the invention demonstrates conditions under which the high-efficiency solution is stable. Second, multi-stable solutions are observed, which can be used for optical logic, switching, rectification, and other transistor-like functions similar to previous work on bistabiity in singly-resonant cavities. Third, there are "phase transitions" in which solutions switch from stable to unstable and vice versa. The number of stable solutions change, as in the input power and other parameters are varied (e.g. one could vary the Q of the resonator by mechanical changes to the geometry or via other phenomena such as charge-carrier injection, thermal changes, stress-optic coefficients and piezo-electric materials, nonlinear optical changes in the index via external illumination, and so on). Again, this could be used for switching, rectification, logic, amplification, and other transistor-like functions that rely on rapid nonlinear changes in input/output characteristics.

Also, the existence of limit-cycle behaviors are shown, which allow one to construct long-period optical oscillators in the GHz-THz regimes, for applications such as optical clocks, modulator/demodulators, spectroscopy, ultra-fast signal processing, high-speed data transmission, digital radar, tomography, and other applications. In addition, the invention allows one to excite different solutions by various transient input-pulse shapes preceding the steady-state input, including how to robustly excite a particular high-efficiency solution, and to adiabatically switch between multiple solutions and limit cycles.

Simulations illustrate where losses (such as linear losses, radiative loss, absorption, two-photon absorption, etc.) were included, and found that the results and existence of limit cycles, etc. do not qualitatively change, they merely operate at a somewhat lower efficiency (depending on the degree of the losses).

Similar phenomena occur in $\chi^{(2)}$ nonlinear media for second-harmonic generation. There, it is found that the 100%-efficiency solution is indeed stable, in this case for all parameters $\tau_{1,2}$ and nonlinear coupling factors $\beta$; unlike the $\chi^{(3)}$ case, there is no lifetime where the solution becomes unstable, nor are there SPM/XPM effects in $\chi^{(2)}$ media (and hence no detuning is required). Moreover, one finds limit cycles in the $\chi^{(2)}$ case, which arise for input powers different from the $\chi^{(2)} P_{crit}$.

Finally, similar phenomena should also arise in doubly and triply resonant cavities coupled nonlinearly by sum/difference frequency generation (for $\chi^{(2)}$) or four-wave mixing (for $\chi^{(3)}$). The advantage of this is that the coupled frequencies can lie closer together, imposing less stringent materials constraints and allowing the cavity to be confined by narrow-bandwidth mechanisms such as photonic bandgaps. For example, one could have a triply-resonant cavity with frequencies $\omega_{1,2,3}$, where $\omega_3 = \omega_1 \pm (\omega_2 - \omega_3)$, where there is a pump input at frequency $\omega_2$ that resonantly converts light at a frequency $\omega_1$ to a frequency $\omega_3$ via $\chi^{(3)}$ four-wave mixing.

Although the present invention has been shown and described with respect to several preferred embodiments thereof, various changes, omissions and additions to the form and detail thereof, may be made therein, without departing from the spirit and scope of the invention.

What is claimed is:

1. A nonlinear harmonic generation system comprising:
a waveguide channel for receiving and propagating electromagnetic signals; and
a resonant cavity being coupled to said waveguide channel, said resonant cavity structure having a plurality of resonant modes into which electromagnetic energy is coupled during the operation of said system, one of said resonant modes having a resonant frequency that changes during operation of said system to reach either an input-signal frequency or a harmonic frequency for a majority of the time in which harmonic generation is occurring, where both reflected and harmonic fields are emitted back into said waveguide channel so as to allow efficient harmonic generation at a specified critical input power.

2. The nonlinear harmonic generation of claim 1, wherein said resonant modes comprise two resonant modes.

3. The nonlinear harmonic generation of claim 1, wherein said resonant modes are coupled by a Kerr ($\omega^{(3)}$) nonlinearity.

4. The nonlinear harmonic generation of claim 1, wherein said harmonic generation comprises ($\chi^{(2)}$) nonlinearity.

5. The nonlinear harmonic generation of claim 1, wherein said harmonic generation comprises third-harmonic conversion.

6. The nonlinear harmonic generation system of claim 1, wherein said resonant cavity is substantially circular in cross section.

7. The nonlinear harmonic generation system of claim 1, wherein a plurality of said resonant modes have resonant frequencies that change during operation of said system to reach either an input-signal frequency or a harmonic frequency for a majority of the time in which harmonic generation is occurring.

8. The nonlinear harmonic generation system of claim 1, wherein the harmonic-generation efficiency is at least 35%.

9. The nonlinear harmonic generation system of claim 1, wherein the harmonic-generation efficiency is at least 70%.

10. A method of performing nonlinear harmonic conversion comprising:
    positioning a waveguide channel for receiving and propagating electromagnetic signals; and
    coupling a resonant cavity to said waveguide channel, said resonant cavity structure having a plurality of resonant modes into which electromagnetic energy is coupled during the operation of said system; and
    changing the frequency of one of said resonant modes during operation of said system to reach either an input-signal frequency or a harmonic frequency for a majority of the time in which harmonic generation is occurring, where both reflected and harmonic fields are emitted back into said waveguide channel so as to allow efficient harmonic generation at a specified critical input power.

11. The method of claim 10, wherein said resonant modes comprise two resonant modes.

12. The method of claim 10, wherein said resonant modes are coupled by a Kerr ($\chi^{(3)}$) nonlinearity.

13. The method of claim 10, wherein said harmonic generation comprises ($\chi^{(2)}$) nonlinearity.

14. The method of claim 10, wherein said harmonic generation comprises third-harmonic conversion.

15. The method of claim 10, wherein said resonant cavity is substantially circular in cross section.

16. The method of claim 10, wherein a plurality of said resonant modes have resonant frequencies that change during operation of said system to reach either an input-signal frequency or a harmonic frequency for a majority of the time in which harmonic generation is occurring.

17. The method of claim 10, wherein the harmonic-generation efficiency is at least 35%.

18. The method of claim 10, wherein the harmonic-generation efficiency is at least 70%.

19. The method of claim 10, wherein said critical input power is reached after changing the input power to: first, a power larger than said critical input power; second, a power smaller than said critical input power; and, third, increasing the power to said critical input power.

20. An oscillator system comprising:
    a waveguide channel for receiving and propagating electromagnetic signals; and
    a resonant cavity being coupled to said waveguide channel, said resonant cavity structure having a plurality of resonant modes into which electromagnetic energy is coupled during the operation of said system; said resonant modes are coupled by a Kerr nonlinearity, where reflected fields are emitted back into said waveguide channel with a specified power having oscillations that include a frequency substantially lower than any frequency of the input electromagnetic wave.

21. The oscillator system of claim 20, wherein said resonant modes comprise two resonant modes.

22. The oscillator system of claim 20, wherein said reflected power comprises electromagnetic waves including a third-harmonic frequency of the input electromagnetic wave.

23. The oscillator system of claim 20, wherein said reflected-power oscillations include a frequency smaller than $1/100$ of any frequency of the input electromagnetic wave.

24. The oscillator system of claim 20, wherein said reflected-power oscillations include a frequency smaller than $1/500$ of any frequency of the input electromagnetic wave.

* * * * *